United States Patent [19]

Jenkins

[11] Patent Number: 5,165,662
[45] Date of Patent: Nov. 24, 1992

[54] FIBRE BLOWING BRAKE

[75] Inventor: Peter D. Jenkins, Woodbridge, England

[73] Assignee: British Telecommunications public limited company, United Kingdom

[21] Appl. No.: 681,537
[22] PCT Filed: Oct. 2, 1989
[86] PCT No.: PCT/GB89/01165
§ 371 Date: May 7, 1991
§ 102(e) Date: May 7, 1991
[87] PCT Pub. No.: WO90/04191
PCT Pub. Date: Apr. 19, 1990

[30] Foreign Application Priority Data

Oct. 5, 1988 [GB] United Kingdom ............... 8823426

[51] Int. Cl.$^5$ .............................................. B66F 3/24
[52] U.S. Cl. .............................................. 254/134.4
[58] Field of Search ............... 254/134.3 R, 134.3 FT, 254/134.4; 226/25, 43, 178

[56] References Cited

U.S. PATENT DOCUMENTS

| | | | |
|---|---|---|---|
| 2,515,953 | 7/1950 | Dufresne | 254/134.4 |
| 3,533,599 | 10/1970 | Hindenburg | 254/134.3 FT |
| 4,206,860 | 6/1980 | Lee | 226/97 |
| 4,702,404 | 10/1987 | Einsle et al. | 226/7 |
| 4,850,569 | 7/1989 | Griffioen et al. | 254/134.4 |
| 4,953,827 | 9/1990 | Araki et al. | 254/134.4 |

FOREIGN PATENT DOCUMENTS

| | | |
|---|---|---|
| 0108590 | 5/1984 | European Pat. Off. |
| 0253636 | 1/1988 | European Pat. Off. |
| 3409376 | 12/1985 | Fed. Rep. of Germany |
| 1262772 | 2/1972 | United Kingdom |
| 8706803 | 3/1987 | United Kingdom |

*Primary Examiner*—J. J. Swann
*Attorney, Agent, or Firm*—Nixon & Vanderhye

[57] ABSTRACT

Apparatus is described for inhibiting fluid flow and fibre package (3) motion in a fibre blowing operation. The apparatus comprises a fluid flow passageway (8) with a valve (9), and a bypass passageway (7) for the fibre package (3) in the vicinity of the valve (9). A flexible membrane (11) is interposed between the fluid flow passageway (8) and the fibre bypass passageway (7), which membrane bears against the fibre package (3) and closes the bypass passageway when the valve (9) is closed.

6 Claims, 3 Drawing Sheets

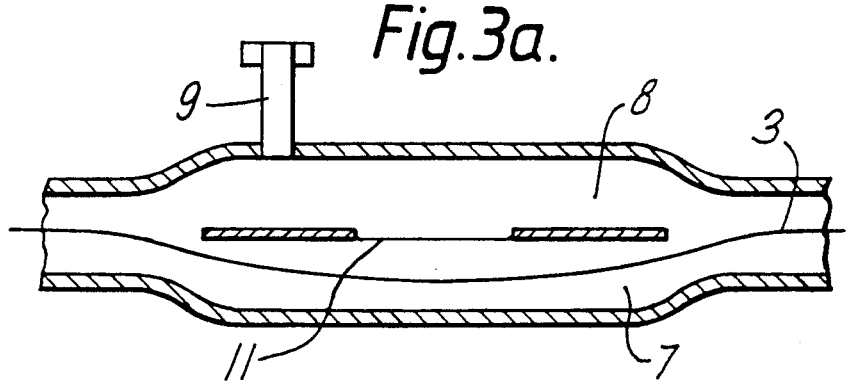
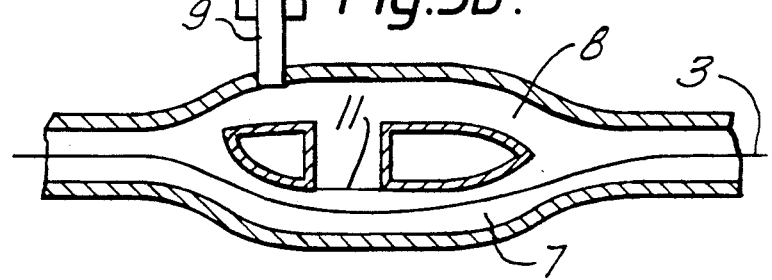
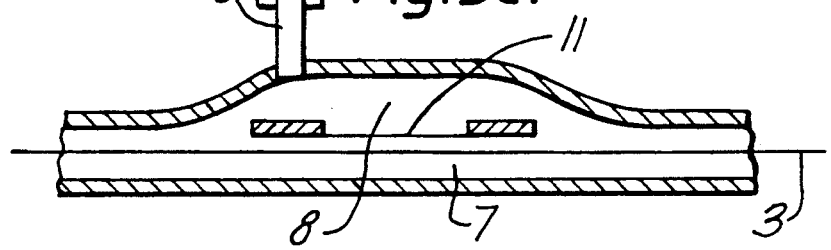

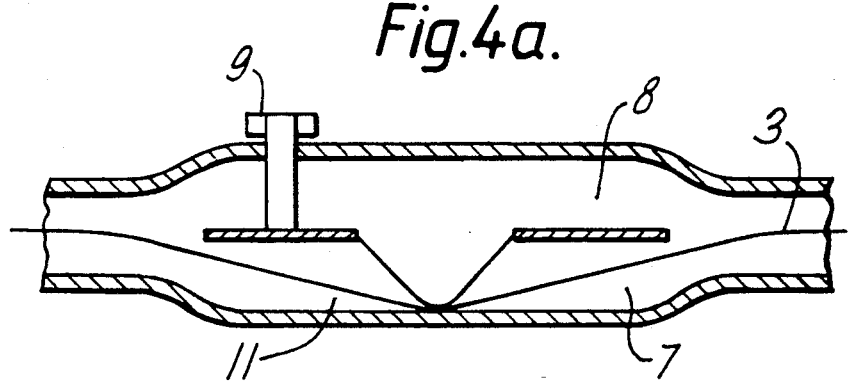
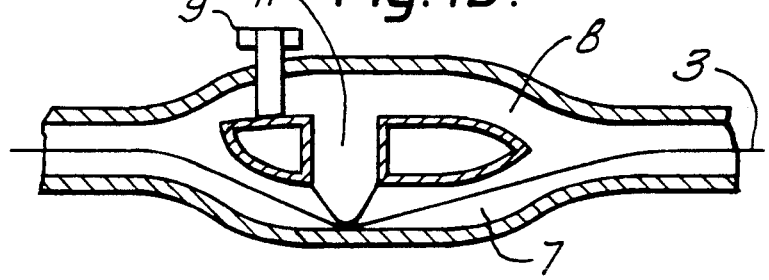
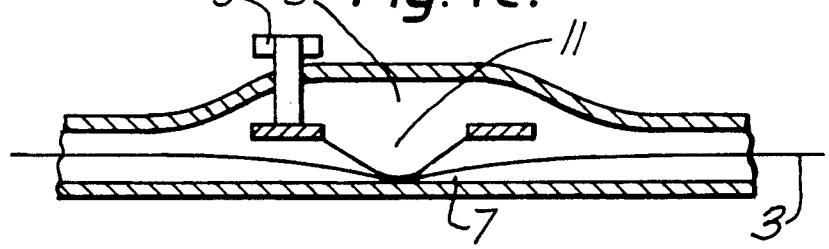
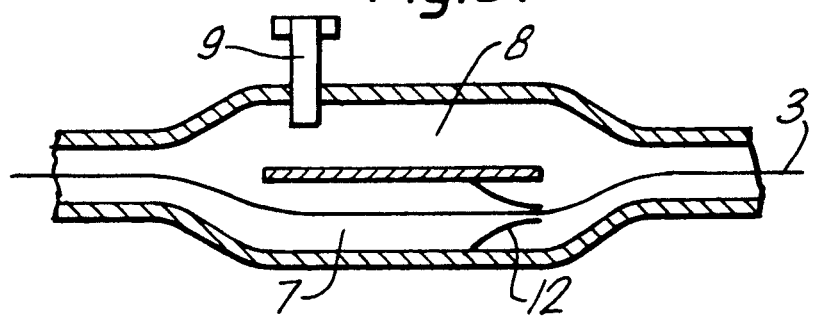

FIBRE BLOWING BRAKE

This invention relates to fibre blowing.

Fibre blowing is a process in which lightweight transmission lines are advanced through installation ducts by the viscous drag of a fluid, usually compressed air. This process is described in our European patent specification 108590.

A known form of fibre blowing apparatus includes a transmission line package coiled into a sealed, pressurised container, the pressure within the container providing the propellant gas, thus eliminating the need for a compressor or other separate source of propellant. Such pressurised containers may be particularly useful for repair work.

A disadvantage of such an arrangement is that, once the pressure in the container is released to commence installation of a transmission line package into a duct, the propellant cannot be shut off without a substantial risk of that portion of the package which is already in the duct being damaged by closure of a valve to block the duct. This is particularly a problem where the package contains delicate transmission lines such as optical fibres. Also, the package travelling along the duct has a significant momentum, and, if abruptly halted, the tension induced at the halting point may be harmful.

A further problem that may be experienced in the pressurised container method of fibre blowing is that the initial pressure may be very much greater than that necessary to ensure that there is sufficient propellant to ensure that all the package in the container can be installed.

The aim of the invention is to provide apparatus for selectively inhibiting the flow of fluid from a pressurised container of fibre package, and for inhibiting or retarding the advance of the fibre package.

The present invention provides apparatus for inhibiting fluid flow and fibre package motion in a fibre blowing operation, the apparatus comprising a passageway along which a fibre package and fluid flow can be passed, a first junction at which the fibre package and at least part of the fluid flow can separate along, respectively, a fibre package passageway and a fluid flow passageway, a second junction at which the fibre package passageway and the fluid flow passageway recombine, a valve disposed in the fluid flow passageway between the first and second junctions for selectively blocking the fluid flow along the fluid flow passageway, and a flexible sealing member for sealing against the fibre to inhibit fluid flow along the fibre passageway.

In a preferred embodiment, the fluid flow passageway is separated from the fibre passageway by an elastic, flexible membrane located between the first and second junctions and preceding the valve, the arrangement being such that, upon closure of the valve, pressure in the fluid flow passageway expands the membrane into the fibre package passageway.

In the context of this specification, the term "fibre package" means any line or filament capable of installation by the fibre blowing technique, and is not necessarily restricted to optical fibres.

The invention will now be described in greater detail, by way of example, with reference to the accompanying drawings, in which:

FIGS. 3a to 3c are schematic diagrams of modified forms of the braking assembly of FIG. 1, each showing the fibre package being propelled along a duct;

FIGS. 4a to 4c are schematic diagrams of the arrangements of FIGS. 3a to 3c with the propellant and fibre package flow inhibited; and FIG. 5 shows a further modified form of the braking assembly of FIG. 1.

Figure 1A:
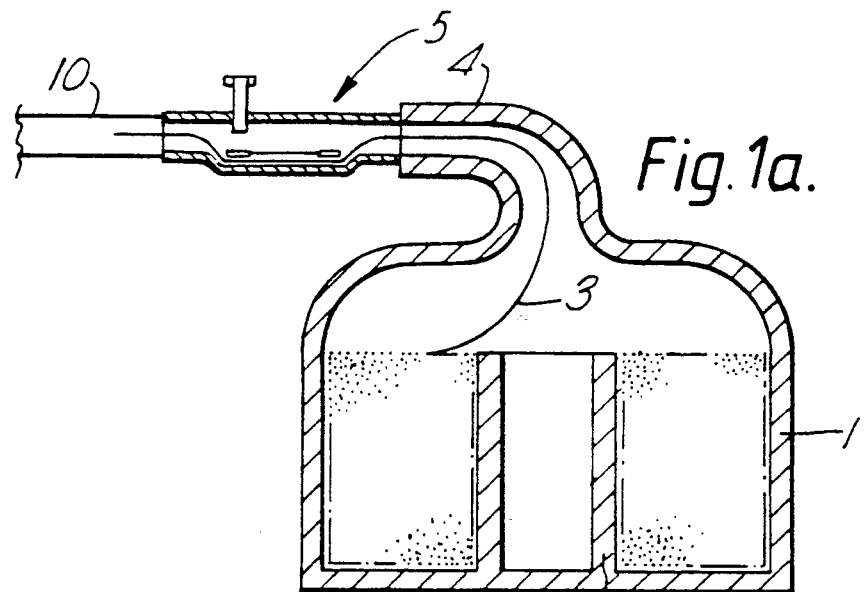
FIG. 1a is a close up of the braking assembly of FIG. 1.
Figure 1B:
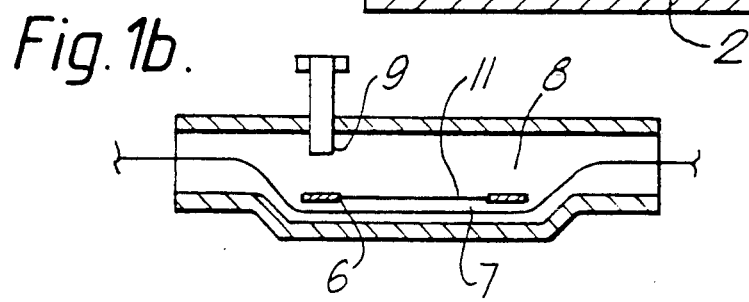
FIG. 1 is a schematic diagram of a pressurised container containing a fibre package, a propellant and a fibre braking assembly, and shows the fibre package being propelled along a duct.
Figure 2A:
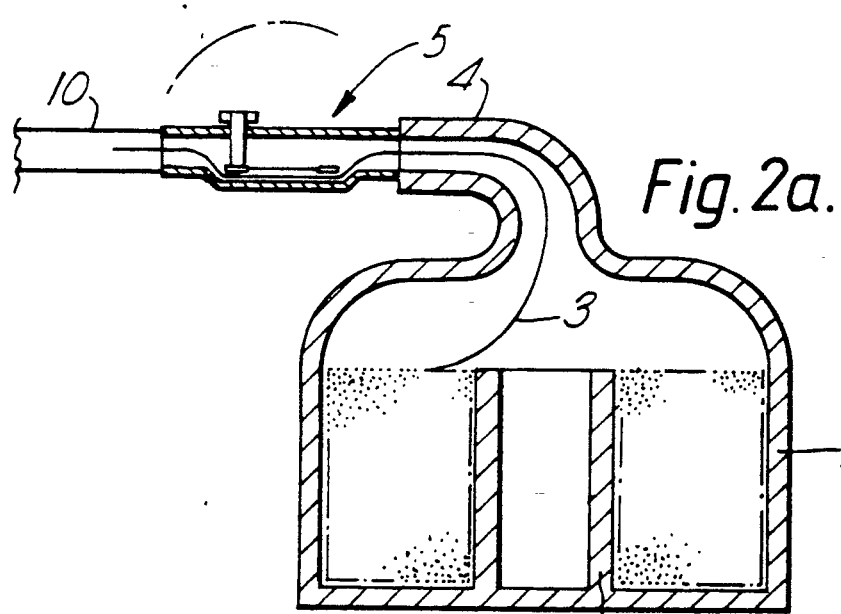
FIG. 2 is a schematic diagram of the arrangement of FIG. 1 with the propellant and fibre package flow inhibited.
FIG. 2b is the braking assembly of FIG. 1 with the propellant and fiber package flow inhibited.
Figure 2B:
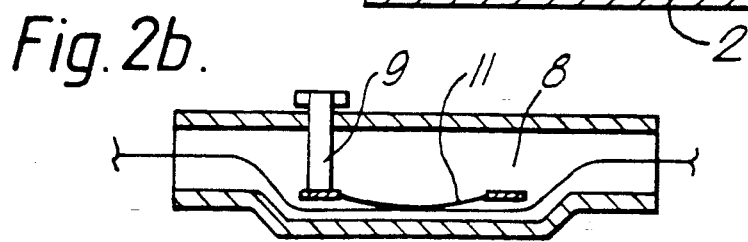

Referring to the drawings, FIG. 1 shows a container 1 having a central annulus 2 about which a coil of fibre package 3 is wound. The fibre package 3 may comprise, for example, one or more optical fibres enclosed in a lightweight protective covering. The fibre package 3 is threaded through a funnel portion 4 on the container 1, and into a braking section 5. The braking section 5 is divided into a double passageway 7, 8 by a dividing wall 6. As shown in FIGS. 1 and 2, the fibre package 3 is diverted into the passageway 7, and the other passageway 8 is provided with a valve 9.

The container 1 is capable of being sealed and maintained under pressure by closing the brake valve 9 to operate a sealing mechanism described hereinafter. A separate port (not shown) for pressurising the container 1 may be provided. Alternatively, the container 1 may be pressurised through the braking section 5 with the valve 9 open, the valve 9 then being closed before the pressurising source is disconnected. During the pressurising process, and for transportation, the free end of the fibre package 3 may be taped or clipped to the outermost end of the braking section 5 to prevent unthreading.

An installation duct 10 is connected to the outermost end of the braking section 5. The outermost end of the braking section 5 would generally be cleared, prior to connection of the container 1 to the installation duct 10, thereby eliminating any damage caused due to securing or exposure. After the container 1 is connected to the duct 10 in order to commence installation, the valve 9 is opened to the configuration shown in FIG. 1. Pressurised gas then commences escaping from the container 1 along the passageways 7 and 8 and into the duct 10, the pressurised gas propelling the fibre package 3 along the duct. Various techniques may be employed to aid insertion of the free end of the fibre package 3 into the duct 10. Thus, a length of the fibre package 3 released from the container 1, prior to connection of the duct, may be manually inserted. Alternatively, the duct 10 (or a connection tube) may be vented a short distance away from the container 1, in order to create a high local flow and draw the free end of the fibre package 3 into the duct.

When it is desired to cease the installation process, the valve 9 is closed. At this point, there is still a route for propellant along the passageway 7, although this passageway is insufficient to provide a substantive alternative route for the air. A part of the wall 6 between the passageways 7 and 8 is made of a membrane 11 of flexible, elastic material such as a soft grade of rubber. As pressure builds up in the now closed off passageway 8, the membrane 11 balloons outwardly into the passageway 7, and commences pressing against the fibre package 3 and the walls of passageway 7. The sizes of the membrane 11 and the passageways 7 and 8 are such that, at the operating pressures of the container 1, the membrane 11 completely closes off the passageway 7. It should be noted that the passageway 7 is drawn on an enlarged scale for clarity: in fact it should only be sufficiently wide for the passage of the fibre package 3, and thus very little air flow is required to enable closure by the flexible membrane 11. The passageway 8 is much larger, thereby permitting a high air flow with little pressure differential.

Since the expansion of the membrane 11 into the passageway 7 takes a finite time, there is a period, after the closure of the valve 9, when the membrane bears against the fibre package 3 and the wall of the passageway 7, but not sufficiently firmly to stop all air flow through the passageway 7. During this period, the fibre package 3 is retarded, both by friction and reduced flow, which has the advantage of preventing sudden tensioning of the fibre package when it is finally stopped. In a similar way, successively opening and closing of the valve 9 may be used to slow down installation when the pressure in the container 1 is comparatively high (for example during the initial stages of discharge) without wasting propellant. After closure of the valve 9, installation can be recommenced by re-opening the valve. Alternatively, the installed length of the fibre package 3 may be cut free, and the remaining unused portion of the fibre package used in another location.

The structure of the passageways 7 and 8 may comprise two side-by-side tubes with a common wall portion, the common wall portion having three longitudinally-spaced ports (not shown), the two end ports being for diversion of the fibre package 3, and the central port being for supporting the flexible membrane 11. The fibre diversion tube (the passageway 7) may be made smaller than the other tube (the passageway 8). An equivalent arrangement may be made by a single tube having an internal partition (see FIG. 3a), by a branched structure (see FIG. 3b), or by a diversion path for the propellant (see FIG. 3c) leaving a straight, through-path for the fibre package 3. This last-mentioned arrangement is particularly preferable. In each case, the general structure is the same, namely two passageways with communicating entry and exit ports, and an intermediate port blocked by a membrane. The fibre package 3 passes along one route, the other route being blocked by the valve 9. FIGS. 4a, 4b and 4c show the same arrangements with the fibre package 3 braked.

Another alternative to the embodiments shown in FIGS. 1 to 4 is to eliminate the port with the flexible membrane, and to locate a pressure-sensitive seal 12 (see FIG. 5) around the entry port to the fibre passageway 7. Under flow conditions, the seal 12 lightly rests against the fibre package 3, but, as soon as pressure builds up above a predetermined level in the propellant passageway 8, the seal is urged tightly around the fibre package 3, preventing further movement or escape of propellant into the passageway 8. In this case, the restriction caused by the seal 12 results in the main flow of propellant being along the passageway 8, and the section of the fibre package 3 within the fibre passageway 7 is not subjected to viscous drag. However, the length of the fibre package 3 within the passageway 7 is not sufficient to influence the installation significantly.

I claim:

1. Apparatus for inhibiting fluid flow and fibre package motion in a fibre blowing operation, the apparatus comprising a passageway along which a fibre package and fluid flow are passed, together a first junction at which the fibre package and at least part of the fluid flow separate along, respectively, a fibre package passageway and a fluid flow passageway, a second junction at which the fibre package passageway and the fluid flow passageway recombine, a valve disposed in the fluid flow passageway between the first and second junctions for selectively blocking the fluid flow along the fluid flow passageway and a flexible sealing member disposed within the fiber passageway for sealing against the fibre package to inhibit fluid flow along the fibre passageway.

2. Apparatus as claimed in claim 1, wherein the fluid flow passageway is separated from the fibre passageway by a wall, the wall including an elastic, flexible membrane located between the first and second junctions and preceding the valve, the arrangement being such that, upon closure of the valve, pressure in the fluid flow passageway expands the membrane into the fibre package passageway.

3. Apparatus as claimed in claim 2, wherein the membrane constitutes the flexible sealing member.

4. Apparatus as claimed in claim 2, wherein the membrane is expandable to press the fibre package progressively against the wall of the fibre passageway.

5. Apparatus as claimed in claim 1, wherein the flexible sealing member comprises a lip seal in the fibre passageway.

6. Apparatus as claimed in claim 1 wherein the fiber package is supplied from a pressurized container.

* * * * *